Oct. 11, 1932.  C. BROSSMAN  1,882,546
SEWAGE DISTRIBUTOR
Filed Dec. 10, 1930
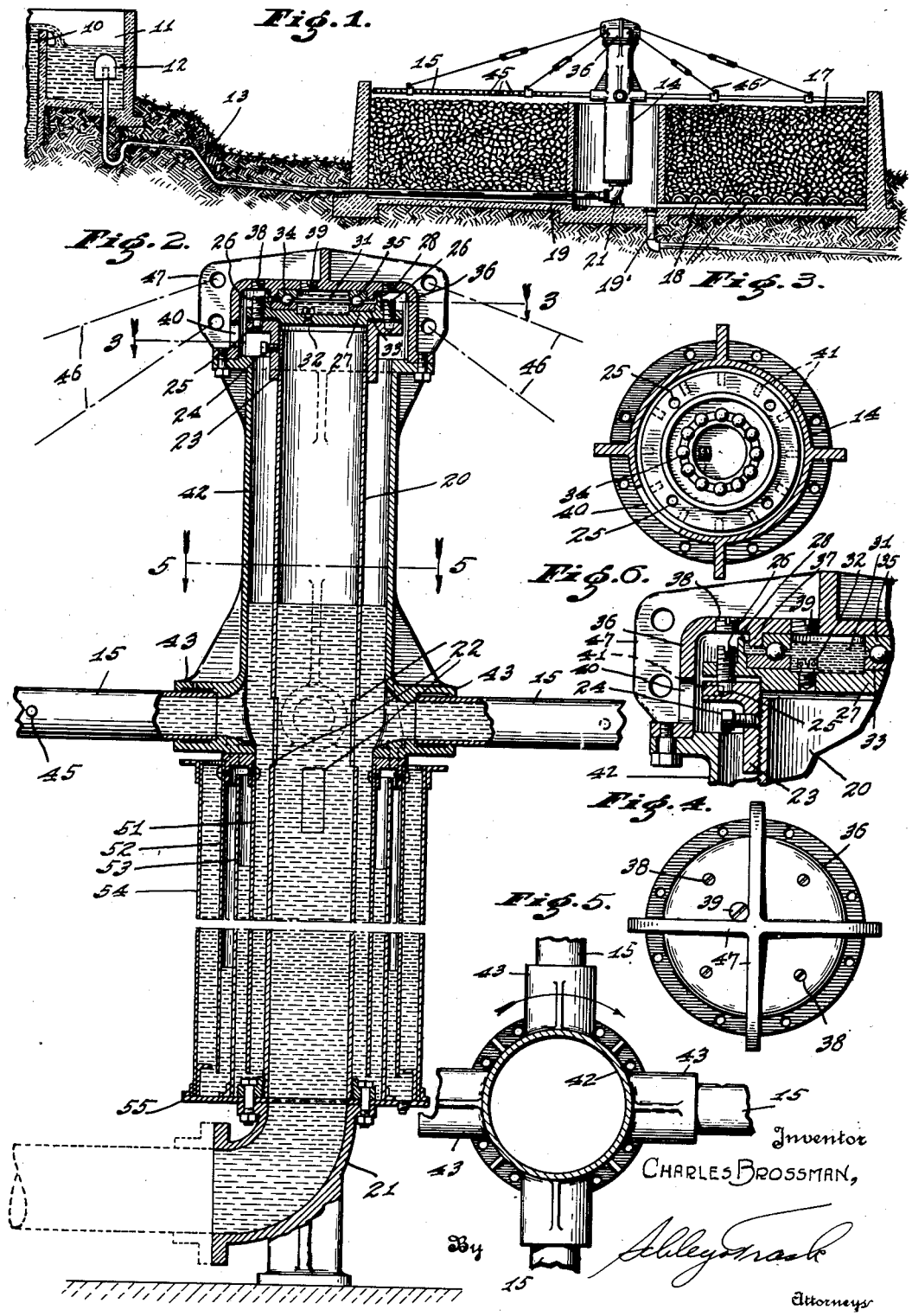
Inventor
CHARLES BROSSMAN,
By
Attorneys Patented Oct. 11, 1932

1,882,546

UNITED STATES PATENT OFFICE

CHARLES BROSSMAN, OF INDIANAPOLIS, INDIANA

SEWAGE DISTRIBUTOR

Application filed December 10, 1930. Serial No. 501,184.

My invention relates to sewage-distributors, for distributing sewage over percolating filter beds, adapted to be rotated over a circular filter bed and to distribute the sewage from perforated pipes extending radially from a central pillar; and in which the power required to rotate the distributor is derived from the reaction of the jets of sewage discharged from the radiating pipes of the distributor.

Since sewage usually reaches a sewage disposal plant at a relatively low level, it is usually necessary that such a sewage distributor operate with a very small head, or difference in level between the inlet and outlet, in order to eliminate the necessity for raising the sewage by pumping. It is therefore essential that a rotary sewage distributor which derives its power from the flow of sewage shall operate with the least possible friction.

It is also desirable that the axis and plane of rotation of such a rotary sewage distributor be quite accurately located, usually so that the axis is vertical even though the stationary support is not; for even the slightest tilting of such axis produces a marked displacement in height of the ends of the radiating arms, which are often fifty feet or more long.

It is the object of my invention to produce such a rotary sewage distributor which will turn easily, to the end that rotation may be readily started and continued with a very small head; which will be capable of easy and convenient adjustment, especially to compensate for any misalinement; which will be dependably automatic in its operation; and which will necessitate practically no attention or upkeep.

The accompanying drawing illustrates my invention: Fig. 1 is a somewhat diagrammatic sectional view of a sewage-supply tank and filter bed, showing the rotary distributor in elevation in operating position; Fig. 2 is a vertical section on a larger scale, through the central standard of the rotary distributor; Fig. 3 is a horizontal section taken on the line 3—3 of Fig. 2; Fig. 4 is a plan of the distributor head; Fig. 5 is a horizontal section taken on the line 5—5 of the central pillar, showing in plan the distributing-arm arrangement; and Fig. 6 is an enlarged fragmentary vertical section of the distributor head and its support.

As is shown in Fig. 1, the apparatus to which my invention relates is for use in a sewage plant usually comprising a settling tank 10, and a dosing tank 11 for receiving the sewage from the settling tank communicating through a siphon 12 and a trapped supply pipe 13 with a rotary sewage distributor 14 discharging over a percolating filter bed 17. The distributor has radial pipes 15 through which the sewage is discharged by discharge holes 45 therein onto the circular percolating filter bed 17. The discharge holes 45 discharge horizontally, so that the reaction from the discharge jets tends to move the pipes 15 horizontally in a direction opposite to such discharge; and they are so arranged on the various pipes that such discharge reactions from all the jets tend to turn the rotary portion of the distributor in the same direction about a vertical axis of rotation. After percolating through the filter bed 17, the purified sewage collects in spaces conveniently provided by inverted half-tiles 18 communicating with one or more troughs 19 whence it is discharged into the central well of the filter bed and to the discharge pipe 19'.

The filter bed 17 is of any usual type, ordinarily a bed of crushed rock where the usual aerobic bacteria collect on the surfaces of the rock pieces to digest the sewage as it trickles over those surfaces.

Because of the necessity that the sewage pass over the pieces of stone in a thin film, it is essential that the distributing apparatus may be depended upon to distribute the sewage evenly and slowly over the filter bed.

In the sewage distributor shown in the drawing, there is a central cylindrical standard 20, located in a central well in the filter bed, and supported on an elbow stand 21 through which it is supplied with sewage from the supply pipe 13. This central standard 20 is provided with a series of staggered openings 22 to allow the outflow of sewage therefrom into a drum 42, to be described later; and its upper end is provided with external screw-threads desirably extending for a considerable vertical distance.

An internally threaded bearing-supporting collar 23 in the form of a flanged sleeve is screw-mounted on this upper threaded portion of the standard 20, to be vertically adjustable thereon by being rotated; and is desirably long enough to permit its upper face to remain above the upper end of the central standard throughout a considerable range of such vertical adjustment. In order that it may be secured in any position of vertical adjustment, it is provided with a set-screw 24. The flange is at the upper end of such support, and has a peripheral series of radial holes 41 for receiving a rod by which the support may be turned on the central standard 20 to obtain the vertical adjustment.

A bearing seat or plate 27 is supported on the flange of the collar 23 by means of a plurality of push-screws 26 threaded through tapped holes in that bearing seat and having their lower ends received in holes 25 in the flange of the collar 23. Desirably these push-screws are four in number, for ready tilting adjustment, and I have so shown them.

A distributor head 36 is supported for rotation on the bearing seat 27 by means of a suitable bearing, desirably an annular series of balls 34. The balls lie between a lower ball-race 33 supported on the bearing seat 27, and an upper ball-race 35 resting against and supporting the head 36.

I secure adequate and permanent lubrication of the bearing and protect it from exposure by covering the balls 34 with a bath of oil and providing an oil seal around the edges of the oil container. To this end, the bearing seat 27 is a plate extending over the upper end of the central standard 20, and it has an annular wall 28 extending upwardly just outside the lower ball race 33, to provide an upwardly opening cup, whose sides surround the two ball races and the balls and serve to retain the lower race 33 in proper position. This cup holds sufficient oil 31 to cover the balls 34. The upper ball race 35 is of somewhat smaller outer diameter than the lower race 33; and just outside it an annular wall 37 extends downwardly from the head 36 to within the cup on the bearing seat 27, conveniently fairly close to the annular wall 28 thereof. The lower edge of this depending annular wall 37 lies well below the normal oil-level within the cup formed by the bearing seat 27 and its wall 28, so that an effective oil seal is formed to exclude any gases or water vapor which might otherwise damage the bearings.

For convenience in draining and replenishing the oil contained in the annular wall 28, the central plate portion of the bearing seat 27 is provided with an eccentrically placed drain-plug 32, and the head is provided with a large and similarly eccentrically placed hole which may be brought into registry with the drain plug for removing and replacing the latter. The hole in the head may be closed by a screw-plug 39, which is removed to give access to the drain-plug 32 and to fill the cup with oil. The head is otherwise imperforate within the annular wall 37, so that the oil which covers the ball-bearing is not exposed.

The distributor head as a whole is desirably in the form of an inverted cup having an outer circular wall surrounding the whole bearing structure just described and extending downwardly without any openings to at least the lower face of the bearing seat 27.

At the level of the flange on the bearing supporting collar 23 the head is conveniently provided with an arcuate slot 40 for permitting access to the set-screw 24 on the bearing supporting collar and to the holes 41. The slot is desirably of sufficient extent to expose two holes 41 simultaneously, to facilitate adjustment.

For adjusting the push-screws in the bearing seat 27, holes normally closed by screw-plugs 38 may be provided in the head 36 in position to be brought into registry with those push-screws. Desirably there are at least two such holes, diametrically opposite each other to expose two opposite push-screws; and conveniently there are four, to expose all four push-screws at once.

A carrying drum 42 is bolted to the lower edge of the head 36 and depends therefrom and surrounds the central standard 20. At its lower end, this drum is provided with radially extending bosses 43, shown as four in number, for supporting the inner ends of the distributing pipes 15. These pipes are additionally supported by guys 46 extending between reinforcing ribs 47 on the distributor head 36 and spaced points on such pipes. The sewage which is discharged by way of the holes 22 from the central standard 20 into the drum 42 passes from such drum into these radial distributing pipes. These radial pipes are provided with a series of sewage discharge holes 45 for discharging such sewage horizontally as already stated, and opening in the direction opposite to that in which the rotating member of the distributor is to rotate.

All the revolving parts of the distributor are carried by the bearings above referred to, which are the only wearing parts.

To provide a seal around the lower part of the carrying drum 42, I use an air lock or double trap, of a type already known. This air seal is formed by two spaced concentric cylinders 51 and 52 depending from the lower end of such drum and dipping into the water or sewage in two annular troughs formed by the lower portion of the central standard 20 and two similarly concentric cylinders 53 and 54 fixed on and rising from a plate 55 at the base of the central standard 20. The outer of these annular troughs is at least partly filled with water.

When the sewage plant is in operation, the sewage overflows from the settling tank 10 into the dosing tank 11, where it accumulates until the siphon 12 "lets go." The sewage then flows through the supply pipe 13 and the supporting elbow 21 into the interior of the central standard 20, and passes thence through the holes 22 into the drum 42 and the distributing pipes 15, and establishes a liquid level in the drum at or slightly lower than that in the dosing tank 11.

The sewage also flows down from the drum 42 into and fills the inner annular space between the standard 20 and the inner suspended cylinder 51, and passes under the lower end of that cylinder 51 into the space between the cylinders 51 and 53; whence it forces air contained between the two suspended cylinders 51 and 52 over the top of the stationary cylinder 53 into the space between the cylinders 53 and 52. Here the air is trapped between the sewage and the water in the annular trough between the fixed cylinders 53 and 54, and forces the water level down in the space between the cylinders 53 and 52, to cause it to rise in the space between the cylinders 52 and 54. The movement of air continues until the hydrostatic head due to difference in level between the sewage in the drum 42 and that in the space between the cylinders 51 and 53 is equal to that due to the difference in the level of the water in the space between the cylinders 53 and 52 and that in the space between the cylinders 53 and 54. When this condition is reached, the water-level difference balances the sewage-level difference, and a seal is established which prevents any outflow of sewage but which permits the drum 42 to revolve with practically no friction.

The sewage in the radially extending distributing arms 15 flows out the holes 45 under a head resulting from the difference between the level of sewage in the drum 42 and the level of the holes 45. This flow of sewage from the holes 45 sets up a reaction sufficient to rotate the drum and the distributing pipes as a unit.

If for any reason in installing the sewage distributor the central standard 20 is not quite vertical, or if for any reason it gets out of vertical during operation, or if it is not originally set at exactly the desired hight or for any reason changes in hight with relation to the crushed stone of the filter bed 17, compensating adjustment is easily possible with my device. To raise or lower the pipes 15 as a unit, it is only necessary to loosen the set screw 24, then to turn the bearing support 23 to screw it up or down, and then to retighten the set screw 24 to hold the bearing support in the position to which it has been adjusted. If the axis of the bearing which carries the rotating member of the sewage distributor is out of vertical, for any reason, thus producing a marked raising of the outer ends of the pipes 15 on one side and a marked lowering thereof on the other side on account of the length of such pipes, proper adjustment may conveniently be made by the push-screws 26. To do this, the screw-plugs 38 are removed from their holes, and the rotating member of the sewage distributor is turned to bring those holes over the push-screws 26 or the desired ones of such screws. Then by tightening and loosening different ones of those screws, by a screw driver inserted through such holes, the axis of the bearing may be accurately adjusted to the desired vertical position, to get the pipes 15 accurately in a horizontal plane. When such adjustment has been obtained, the screw-plugs 38 are put back in place in their holes.

The oil 31 of the oil bath in which the bearing is submerged lasts indefinitely; for it is very fully protected. If it is desired to drain off this oil it could be done by first removing the screw-plug 39, and then removing the screw-plug 32 through the hole provided by the removal of the screw-plug 39. If new or more oil is desired in the oil bath, it may be supplied through the hole which the screw-plug 39 normally closes.

I claim as my invention:

1. A sewage distributor, comprising a central hollow standard, a bearing-supporting plate mounted on the upper end thereof for manual adjustment with respect thereto, and a rotary member supported for rotation on said adjustable bearing-plate, said rotary member including projecting arms which are supplied with sewage from said central supporting standard.

2. A sewage distributor, comprising a hollow central supporting standard, a collar vertically adjustable on the upper end of said standard, a bearing-supporting plate tiltably adjustable on said collar, a rotary member rotatably mounted on said bearing-supporting plate, said rotary member including a plurality of distributing pipes extending outward as arms and supplied with sewage from said central supporting standard.

3. A sewage distributor, comprising a central supporting standard, a collar vertically adjustable on the upper end of said standard, a bearing-supporting plate tiltably adjustable on said collar, a rotary member rotatably mounted on said bearing-supporting plate, said rotary member including a plurality of distributing pipes extending outward as arms, and means for supplying sewage to said pipes.

4. A sewage distributor, comprising a central supporting standard, a collar screw-mounted on the upper end of said standard, a bearing-supporting plate mounted on said collar and having mounting screws by which it is tiltably adjustable thereon, a rotatable member rotatably mounted on said bearing-supporting plate said rotatable member including a plurality of perforated pipes extending outward as arms, and means for supplying sewage to said pipes.

5. A sewage distributor, comprising a central supporting standard, a bearing-supporting plate adjustably mounted thereon, a rotary head rotatably mounted on said bearing-supporting plate, said head having depending outer walls which extend downward around the outside of said bearing-supporting plate and being provided with one or more openings through which tools may be inserted to adjust said bearing-supporting plate vertically and tiltably, distributing mechanism hung from said head and including a plurality of pipes projecting outward as arms, and means for supplying sewage to said pipes.

6. A sewage distributor, comprising a central supporting standard, a bearing-supporting plate adjustably mounted thereon, a rotary head rotatably mounted on said bearing-supporting plate, said head having depending outer walls which extend downward around the outside of said bearing-supporting plate and being provided with one or more openings through which tools may be inserted to adjust said bearing-supporting plate, distributing mechanism hung from said head and including a plurality of pipes projecting outward as arms, and means for supplying sewage to said pipes.

7. A sewage distributor, comprising a central supporting standard, a bearing plate mounted on the upper end of said standard and extending across it and having an upwardly extending annular flange, a bearing mounted on said bearing-supporting plate within said annular flange, a head carried by said bearing and having an annular flange which surrounds said bearing but lies within said first-named annular flange, sewage distributing pipes carried by said head, and means for supplying sewage to said pipes, said bearing-supporting plate being provided with a drain opening having a closure.

8. A sewage distributor, comprising a central supporting standard, a bearing plate mounted on the upper end of said standard and extending across it and having an upwardly extending annular flange, a bearing mounted on said bearing-supporting plate within said annular flange, a head carried by said bearing, sewage distributing pipes carried by said head, and means for supplying sewage to said pipes, said bearing-supporting plate being provided with a drain opening having a closure, said closure and the space within said annular flange being accessible through said head.

9. A sewage distributor, comprising a central supporting standard, a bearing plate mounted on the upper end of said standard and extending across it and having an upwardly extending annular flange, a bearing mounted on said bearing-supporting plate within said annular flange, a head carried by said bearing and having an annular flange which surrounds said bearing but lies within said first-named annular flange, sewage distributing pipes carried by said head, and means for supplying sewage to said pipes, said head being provided with an opening having a closure and communicating with the space enclosed by said annular flanges.

10. A sewage distributor, comprising a central supporting standard, a bearing plate mounted on the upper end of said standard and extending across it and having an upwardly extending annular flange, a bearing mounted on said bearing-supporting plate within said annular flange, a head carried by said bearing and having an annular flange which surrounds said bearing but lies within said first-named annular flange, sewage distributing pipes carried by said head, and means for supplying sewage to said pipes, said bearing-supporting plate being provided with a drain opening having a closure operable from above, and said head being provided with an opening which may be brought into alinement with the opening in the bearing supporting plate to give access to said closure and which itself is provided with a closure.

11. A sewage distributor, comprising a central supporting standard, a bearing plate mounted on the upper end of said standard and extending across it and having an upwardly extending annular flange, a bearing mounted on said bearing-supporting plate within said annular flange, a head carried by said bearing, sewage distributing pipes carried by said head, and means for supplying sewage to said pipes, said bearing-supporting plate being provided with a drain opening having a closure operable from above, and said head being provided with an opening which may be brought into alinement with the opening in the bearing supporting plate to give access to said closure and which itself is provided with a closure.

12. A sewage distributor, comprising a central standard, a collar vertically adjustably mounted on said standard, a bearing seat comprising an upwardly opening cup adapted to hold a quantity of oil supported on said bearing support by a plurality of push screws, a bearing on said cup adapted to be immersed in said oil, a head supported for rotation on said bearing, said head having a depending annular wall projecting between said bearing and said cup wall to below the normal level of said oil, sewage distributing pipes carried by said head, and means for supplying sewage to said pipes.

13. A sewage distributor, comprising a central standard, a collar vertically adjustably mounted on said standard, a bearing seat comprising an upwardly opening cup adapted to hold a quantity of oil supported on said bearing support by a plurality of push screws, a bearing on said cup adapted to be immersed in said oil, a removable drain plug in the bottom of said cup, an enclosing head supported for rotation on said bearing having normally closed holes adapted to be alined respectively with said push-screws and drain plug for access thereto and having a depending annular wall projecting between said bearing and said cup wall to below the normal level of said oil, sewage distributing pipes carried by said head, and means for supplying sewage to said pipes.

14. In a sewage distributor, a central supporting standard, a collar having a transversely extending flange, a bearing seat supported on a plurality of push-screws on said flange and having an upwardly extending annular wall, a bearing mounted on said seat within said wall, a head supported for rotation on said bearing, said bearing seat having a drain hole having a closure within said annular wall, and said head having normally closed openings adapted to be alined respectively with said drain hole closure and said push screws for access thereto, said head also having an outer depending wall surrounding said flange provided with an opening through which tools may be inserted for adjusting said collar, and sewage distributing pipes carried by said head.

15. A sewage distributor, comprising a central hollow standard, a bearing-supporting plate mounted on the upper end thereof for manual tiltable adjustment with respect thereto, and a rotary member supported for rotation on said adjustable bearing-plate, said rotary member including projecting arms which are supplied with sewage from said central supporting standard.

In witness whereof, I have hereunto set my hand at Indianapolis, Indiana, this 5th day of December, A. D. one thousand nine hundred and thirty.

CHARLES BROSSMAN.